(12) United States Patent
Schuehler et al.

(10) Patent No.: US 10,935,622 B2
(45) Date of Patent: Mar. 2, 2021

(54) APPARATUS AND METHOD FOR DETERMINING A POSITION OF A TRANSMITTER

(71) Applicant: Fraunhofer-Gesellschaft zur Foerderung der angewandten Forschung e.V., Munich (DE)

(72) Inventors: Mario Schuehler, Effeltrich (DE); Lars Weisgerber, Ebersbach-Neugersdorf (DE); Johannes Arendt, Erlangen (DE); Rainer Wansch, Baiersdorf (DE); Heinrich Milosiu, Erlangen (DE); Frank Oehler, Adelsdorf (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 166 days.

(21) Appl. No.: 16/059,772

(22) Filed: Aug. 9, 2018

(65) Prior Publication Data
US 2018/0372831 A1  Dec. 27, 2018

Related U.S. Application Data

(63) Continuation of application No. PCT/EP2017/052937, filed on Feb. 9, 2017.

(30) Foreign Application Priority Data

Feb. 12, 2016 (DE) .......................... 102016202207.5
Jul. 20, 2016 (DE) .......................... 102016213229.6

(51) Int. Cl.
*G01S 3/14* (2006.01)
*H01Q 21/29* (2006.01)
(Continued)

(52) U.S. Cl.
CPC .................. *G01S 3/14* (2013.01); *G01S 7/03* (2013.01); *G01S 13/75* (2013.01);
(Continued)

(58) Field of Classification Search
CPC ...................................................... G01S 13/82
See application file for complete search history.

(56) References Cited

U.S. PATENT DOCUMENTS 3,739,378 A * 6/1973 Botzum .................. G01S 13/66
342/50
3,997,897 A * 12/1976 Brunner ................ G01S 13/872
342/43

(Continued)

FOREIGN PATENT DOCUMENTS

EP       2098979 A1 *  9/2009  ............. G01S 13/82
WO    2009147662 A1   12/2009
(Continued)

OTHER PUBLICATIONS

Written Opinion of the International Search Authority for PCT/EP2017/052937; European Patent Office; Munich, Germany; dated Aug. 17, 2017. (Year: 2017).*

(Continued)

*Primary Examiner* — Bernarr E Gregory
(74) *Attorney, Agent, or Firm* — Perkins Coie LLP; Michael A. Glenn

(57) ABSTRACT

The invention relates to an apparatus for determining information on a position of a transmitter with an antenna apparatus, a control apparatus and a data processing apparatus. The antenna apparatus includes several different directional characteristics that each relate to an amount of spatially different receive sensitivities of the antenna apparatus. The antenna apparatus includes signal outputs, wherein the directional characteristics are allocated to the signal outputs.

(Continued)

The control apparatus connects one signal output of the antenna apparatus to an information reading apparatus and further signal outputs of the antenna apparatus to the data processing apparatus. The information reading apparatus determines data transmitted with the signals from the received signals. The data processing apparatus evaluates received signals with respect to their physical characteristics. Further, the invention relates to a respective method.

15 Claims, 2 Drawing Sheets

(51) Int. Cl.
| | |
|---|---|
| G01S 7/03 | (2006.01) |
| G01S 13/75 | (2006.01) |
| G06K 7/10 | (2006.01) |
| H01Q 3/24 | (2006.01) |
| H04B 7/06 | (2006.01) |
| H01Q 3/40 | (2006.01) |
| G01S 3/00 | (2006.01) |

(52) U.S. Cl.
CPC ......... *G06K 7/10356* (2013.01); *H01Q 21/29* (2013.01); *H01Q 3/24* (2013.01); *H01Q 3/40* (2013.01); *H04B 7/0617* (2013.01)

(56) References Cited

U.S. PATENT DOCUMENTS

| | | | | |
|---|---|---|---|---|
| 4,464,662 A * | 8/1984 | Tomasi | ............... | G01S 13/48 342/125 |
| 4,638,317 A | 1/1987 | Evans | | |
| 5,196,855 A * | 3/1993 | Kuroda | ............... | G01S 13/87 342/32 |
| 5,227,803 A * | 7/1993 | O'Connor | ............... | G01S 5/04 342/442 |
| 5,400,031 A * | 3/1995 | Fitts | ............... | G01S 13/87 342/36 |
| 6,344,820 B1 * | 2/2002 | Shiomi | ............... | G01S 13/781 342/165 |
| 6,816,105 B2 * | 11/2004 | Winner | ............... | G01S 13/781 342/37 |
| 7,095,360 B2 * | 8/2006 | Kuji | ............... | G01S 13/781 342/29 |
| 7,420,501 B2 * | 9/2008 | Perl | ............... | G01S 13/872 342/108 |
| 7,812,719 B2 * | 10/2010 | Djuric | ............... | G08B 21/0275 340/539.13 |
| 7,978,066 B2 * | 7/2011 | Lim | ............... | G01S 13/82 340/539.13 |
| 8,102,302 B2 * | 1/2012 | Alon | ............... | G01S 13/78 342/36 |
| 8,433,337 B2 | 4/2013 | Chin | | |
| 9,367,785 B2 * | 6/2016 | Sabesan | ............... | G01S 7/42 |
| 10,133,888 B2 * | 11/2018 | Koyama | ............... | G01S 13/82 |
| 2007/0080787 A1 * | 4/2007 | Taki | ............... | G06K 7/0008 340/10.1 |
| 2009/0002165 A1 * | 1/2009 | Tuttle | ............... | G06K 7/10346 340/572.1 |
| 2010/0328073 A1 * | 12/2010 | Nikitin | ............... | G06K 7/0008 340/572.1 |
| 2011/0068925 A1 * | 3/2011 | Burnside | ............ | G06K 7/10356 340/572.7 |
| 2011/0169613 A1 | 7/2011 | Chen et al. | | |
| 2013/0147609 A1 * | 6/2013 | Griffin | ............... | G06K 7/10356 340/10.5 |
| 2013/0229262 A1 * | 9/2013 | Bellows | ............... | H01Q 3/24 340/10.1 |

FOREIGN PATENT DOCUMENTS

| | | | | |
|---|---|---|---|---|
| WO | WO2011/060942 A1 * | 5/2011 | ............ | G01S 13/75 |
| WO | 2015121204 A1 | 8/2015 | | |

OTHER PUBLICATIONS

International Search Report for PCT/EP2017/052937; European Patent Office; Munich, Germany; dated Aug. 17, 2017; by Bernhard Knoll. (Year: 2017).*

Giorgetti, Gianni et al., "Single-Anchor Indoor Localization Using a Switched-Beam Antenna", IEEE Communications Letters, vol. 13, No. 1, Jan. 2009, pp. 1-3.

Hood, Bryan N. et al., "Estimating DoA From Radio-Frequency RSSI Measurements Using an Actuated Reflector", IEEE Sensors Journal, vol. 11, No. 2, Feb. 2011, pp. 413-417.

Kaiser, Michael, "Kathrein RFID, UHF RFID System der 3. Generation—die Zukunft der drahtlosen Identification", 100% Identification Technology, KRAI Kathrein RFID Antenna Interface, EuroID 2013, 14 pages.

Kalis, A. et al., "Direction Finding in IEEE802.11 Wireless Networks", IEEE Transactions on Instrumentation and Measurement, vol. 51, No. 5, Oct. 2002, pp. 940-948.

Nguyen, Dinh L., "Switched Beam Array Antenna for 2.45 GHz RFID Localisation", Dissertation, The University of Hull, Nov. 2011, pp. 1-135.

Passafiume, M. et al., "On the duality of Phase-based and Phase-less RSSI MUSIC algorithm for Direction of Arrival estimation", Proc. of 3rd International Conference on Circuits, Systems, Communications, Computers and Applications (CSCCA), 2014, pp. 48-54.

* cited by examiner

APPARATUS AND METHOD FOR DETERMINING A POSITION OF A TRANSMITTER

CROSS-REFERENCE TO RELATED APPLICATIONS

This application is a continuation of copending International Application No. PCT/EP2017/052937, filed Feb. 9, 2017, which is incorporated herein by reference in its entirety, and additionally claims priority from German Applications Nos. 102016202207.5, filed Feb. 12, 2016, and 102016213229.6, filed Jul. 20, 2016, which are all incorporated herein by reference in their entirety.

The invention relates to an apparatus for determining at least one piece of information on a position of a transmitter. Further, the invention relates to respective method for determining information on a position of a transmitter.

BACKGROUND OF THE INVENTION

More and more frequently, high-frequency transponders (RFID transponders or RFID tags for "radio frequency identification") allowing identification of objects are used in logistics. These transponders are typically passive and are excited by a high-frequency electromagnetic field. The transponder uses this signal and returns a modulated signal to the RFID reader in response to the excitation. The response signal includes information of the transponder that can be evaluated by the reader. Thereby, an object can be clearly identified and allocated via a transponder. In this case, the reader is in particular a so-called RFID reader that receives and processes the response signals of RFID transponders. Generally, processing consists of extracting the transmitted data and also determining the signal strengths as physical characteristic of the response signal. Depending on the configuration of the RFID transponder, the transmitted data relate, for example, to identification data or measurement data etc.

Apart from the identification of objects, localization of objects is also desirable. For this, first, directional information has to be determined that provides information what direction relative to the position of the reader the transponder returns its answer from. By using a further reader that is spatially separated from the first one, directional information of both can be used to determine the location of the object within a plane. Spatial localization in three-dimensional space involves a third reading device.

With the help of this high-frequency identification of objects and their localization, for example, different goods flow processes can be managed and optimized, such as in the field of logistics or production. In the case of automated detection of objects on a pallet that are moved through a gateway, localization allows automatic detection of the direction; entry and exit can be distinguished. A further application is the location of goods provided with RFID transponders within a storage.

For obtaining directional information with the help of the readers and the signal information of the detected transponders, a data and information connection, respectively, to the readers or a respective software and/or hardware in the reader itself is needed for the evaluation.

In readers having only one terminal (another term is port), normally, an antenna consisting of a single radiator is connected. This allows merely the detection of transponders, but no determination of unique directional information.

Some readers have several ports to which one antenna each can be connected. By the respective antenna, the high-frequency excitation signal is emitted and the response signals of the transponders are received. Typically, within a reader, sequential switching between the antennas having normally one radiator as antenna element is performed. By local distribution of the antennas, the position of the transponders can be inferred. However, the directional information is very inaccurate and ambiguous, respectively, and the distribution of the antennas also involves high space requirements and hence high installation effort.

Directional estimation is possible, for example with known algorithms such as MUSIC ("multiple signal characterization") or ESPRIT ("estimation of signal, parameters via rotational invariance technique"). For this, however, the signal amplitude and phase of the antenna signals, i.e., of the received signals have to be determined. Typical RFID readers do not offer that option since the same provide for each identified transponder merely a measure for the amplitude of the received field strength, "received signal strength indication" (RSSI).

[1] presents an RSSI-based method for direction-finding in wireless networks. By successively switching radiation diagrams with decreasing beam width, the transmitter to be found can be allocated to one sector. Here, however, the resolution accuracy of the direction of incidence is only given by the most narrow beam width, which results in large antenna apertures and expensive beam-forming networks, respectively.

Regarding resolution accuracy, the approach presented in [2] also depends on the beam width. Here, a fixed main beam is mechanically pivoted until the direction having the strongest RSSI value has been found.

A further RSSI-based method is shown in [3]. Here, an allocation between RSSI value and direction in space is obtained by the spatial arrangement of the antennas. Here, the resolution depends on the beam width of the individual radiators.

An RSSI-based approach in combination with the direction estimation algorithm MUSIC is presented in [4]. By searching for the suitable steering vector, the signal covariance matrix is inferred without measuring any phase information. The accuracy of the approach relates strongly to the directivity of the individual antennas.

U.S. Pat. No. 8,433,337 B2 shows an approach where the signals from two antennas are combined with one another in four different ways via a 90° hybrid coupler and an additional switchable phase shifter. Thereby, the phase information is converted into amplitude information such that the phase relation between two antennas can be inferred from the RSSI values. Even with more than two antennas, the same are combined in pairs while the different pairs are activated after one another. Basically, switching is performed between different directional characteristics. However, the directional characteristics have low directivity, since merely two elements are "active" at the same time. By considering noise, ambiguities can occur which can make direction finding impossible. Here, the accuracy also depends on the accuracy of the directivity of the individual elements.

In [5], the signals of four antennas are combined. The antennas are connected to an RFID reader via a so-called Butler-matrix. Within the reader, switching is performed between input ports of the Butler matrix. The angles of incidence within a plane can be inferred from the RSSI values and the characteristics of the Butler matrix. This does not enable direction finding in two dimensions. Further details concerning the Butler matrix can be found, for example, in patent U.S. Pat. No. 4,638,317.

A commercial solution for controlling entry and exit, with simultaneous detection of the transponder information is provided by an RFID reading system (consisting of reader, antenna and interface) of the company Kathrein® (see [6]). The system consists of a reader with embedded antennas which is controlled by an additional interface. However, this solution is reader-dependent. The antenna itself is not suitable for the usage in existing readers or readers of other manufactures.

Normally, the mostly cost-intensive readers are already installed in the respective environments and should not be completely replaced due to the costs involved.

A further option of obtaining signal information from the weak transponder signals for directional estimation is provided by decoupling signals, such that additionally, the phase of the signals can be determined. However, the signal power provided for the reader is reduced and hence the number of detectable transponders and the performance of the reader, respectively, is reduced.

SUMMARY

According to an embodiment, an apparatus for determining at least one piece of information on a position of a transmitter, may have an antenna apparatus, a control apparatus and a data processing apparatus, wherein the antenna apparatus includes several different directional characteristics, wherein the directional characteristics each relate to an amount of spatially different receive sensitivities of the antenna apparatus, wherein the antenna apparatus includes several signal outputs, wherein the directional characteristics are allocated to the signal outputs, wherein the control apparatus is configured to connect one signal output of the antenna apparatus to an information reading apparatus and further signal outputs of the antenna apparatus to the data processing apparatus, wherein the information reading apparatus is configured to determine data from received signals that are transmitted with the signals and wherein the data processing apparatus is configured to evaluate received signals with respect to their physical characteristics.

Another embodiment may have a method for determining at least one piece of information on a position of a transmitter, wherein the transmitter receives signals with different directional characteristics each relating to an amount of spatially different receive sensitivities, wherein data transmitted with the signals are determined from a received signal, and wherein the other received signals are evaluated with respect to their physical characteristics and with respect to the information on the position of the transmitter.

According to another embodiment, an apparatus for determining at least one piece of information on a position of a transmitter may have: an antenna apparatus, a control apparatus and a data processing apparatus, wherein the antenna apparatus includes several different directional characteristics, wherein the antenna apparatus includes a feed network, wherein the feed network effects different directional characteristics of the antenna apparatus and is configured to separate signals received with the antenna apparatus into the individual directional characteristics, wherein the directional characteristics each relate to an amount of spatially different receive sensitivities of the antenna apparatus, wherein the antenna apparatus includes several signal outputs, wherein the directional characteristics are allocated to the signal outputs, wherein the control apparatus is configured to connect one signal output of the antenna apparatus to an information reading apparatus and further signal outputs of the antenna apparatus to the data processing apparatus, wherein the control apparatus is configured to connect the information reading apparatus alternately to different signal outputs of the antenna apparatus and respective further signal outputs of the antenna apparatus to the data processing apparatus, wherein the information reading apparatus is configured to determine data from received signals that are transmitted with the signals and wherein the data processing apparatus is configured to evaluate received signals with respect to their physical characteristics.

The invention comprises an apparatus for determining at least one piece of information on a position of a transmitter. For this, the apparatus comprises an antenna apparatus, a control apparatus and a data processing apparatus. The antenna apparatus comprises several different directional characteristics, wherein the directional characteristics each relate to an amount of spatially different receive sensitivities of the antenna apparatus. Further, the antenna apparatus comprises signal outputs, wherein the directional characteristics are allocated to the signal outputs. Further, the control apparatus is configured to connect one signal output of the antenna apparatus to an information reading apparatus and further signal outputs of the antenna apparatus to the data processing apparatus. Here, the information reading apparatus is configured to determine data from received signals that are transmitted with the signals. Additionally, the data processing apparatus is configured to evaluate received signals with respect to their physical characteristics.

In one configuration, the information reading apparatus is a component of the apparatus. In an alternative configuration, the information reading apparatus is a separate component that can be respectively connected to the apparatus.

Thus, the inventive apparatus comprises an antenna apparatus comprising several directional characteristics. This means that the antenna apparatus receives, depending on the selected directional characteristic, signals with respectively spatially different sensitivities. Or, in other words, depending on the directional characteristic, signals from different spatial areas are advantageous. The directional characteristics are allocated to the signal outputs. A control apparatus connects a signal output to an information reading apparatus and connects further signal outputs to the data processing apparatus. Here, the information reading apparatus and the data processing apparatus differ at least in that the information reading apparatus is configured to determine data from the supplied signal that are transmitted with the signal. Thus, the transmitter radiates signals that also carry information, e.g., for identifying the transmitter or in the form of measurement values or, e.g., in the form of forwarded data. Depending on the type of transmitter, the information reading apparatus is, for example an RFID reader when the transmitter is an RFID transponder, or a satellite receiver for satellite signals when the transmitter is a satellite. The same applies to mobile radio. The data processing apparatus serves to determine the physical characteristics of the signals. In one configuration, the data processing apparatus also allows extracting data from the signals. In an alternative configuration, the data processing apparatus does not allow the extraction of data from the signals, such that in this configuration the data processing apparatus needs less intelligence or can be configured in a simpler manner. Thus, in the latter configuration, the data processing apparatus serves only to determine the physical quantities of the received signals. This is, for example, the signal amplitude of the phase of the received signals. Based on these physical data, the information on the position of the transmitter can be determined, e.g. by applying triangulation.

Generally, the invention describes a reader-independent localization solution which needs, in one configuration, a reader for the excitation. The antenna apparatus and the evaluation of the additionally received signals provides, all in all, the directional information on the transmitter as supplement for the evaluation of the transmitter signals with respect to the transmitted data and information, respectively. Here, the apparatus can be connected to any information reading apparatus.

In one configuration, the apparatus comprises two information reading apparatuses that are accordingly connected to the signal outputs of the antenna apparatus by the control apparatus.

In one configuration, the antenna apparatus is configured such that the antenna apparatus receives signals with several directional characteristics. In one configuration, the antenna apparatus comprises several antenna elements that are allocated to different directional characteristics and that allow continuous reception of signals.

In one configuration, a signal output of the antenna apparatus is allocated to each directional characteristic.

One configuration is that the information reading apparatus is configured to determine both the data transmitted with the signals from the received signals and to evaluate the received signals with respect to their physical characteristics. In this configuration, the information reading apparatus extracts information and data, respectively, from the received signals and additionally determines at least one statement on physical characteristics of the signal. If the information reading apparatus is, for example, an RFID reader, not only the transmitted data are determined but also an RSSI value for the signal amplitude is generated.

In one configuration, it is intended that the data processing apparatus is configured to evaluate the received signals only with respect to their physical characteristics. Thus, the data processing apparatus cannot determine any information from the received signals that have been transmitted with the same. If the above example of RFID transponders is used again, the emitted RFID signals for the data processing apparatus are only electromagnetic signals carrying no further information.

One configuration is that the antenna apparatus comprises several antenna elements. Here, the antenna elements have one directional characteristic each. Finally, the signal outputs are connected to different antenna elements. This is a variation where the signal outputs receive the signals allocated to the allocated directional characteristics separately. In one configuration, the antenna elements are elements of a patch antenna. In alternative configurations, these are dipole antennas, monopole antennas, monopole-type antennas, chip antennas or loop antennas.

In one configuration, it is intended that the antenna apparatus comprises a feed network and that the feed network effects different directional characteristics of the antenna apparatus. Thus, the feed network serves to generate the directional characteristics.

One configuration is that the feed network is configured to separate signals received by the antenna apparatus into the individual directional characteristics., Thus, in one configuration, a Butler matrix is realized in the feed network, which serves to separate the received signals into the individual directional characteristics.

In one configuration, the antenna apparatus is configured as multi-beam antenna. Directional characteristics are characterized by at least one distinct beam with respect to the receive sensitivity.

One Configuration is that at Least One of the Directional Characteristics Differs from the Others at Least with Respect to the Orientation of the Beams.

Thus, the antenna apparatus of the above-stated configurations enables switching of different directional characteristics and receiving signals with different directional characteristics, each comprising a beam. In one configuration, the beams are oriented in particular in different directions. Thus, the multi-beam antenna allows the reception from respectively different spatial areas which mainly differ by the orientation of the (main) beams. By the accompanying reduced spatial area and the knowledge of the orientation of the beams, the information on the position of the transmitter can be determined.

All in all, in one configuration, when using a multi-beam antenna that is excited by a feed network (such as a Butler matrix) and its signal paths, amplitude information and phase information are obtained in the receive case. Feed networks like Butler matrices are usually applied in n*m or n*n multi-beam antennas. Here, the antenna elements or the actual antenna have n signal outputs that are guided to the feed network and are guided from the feed network to m signal outputs.

In one configuration, it is provided that the directional characteristics partly overlap. In an alternative configuration, at least some beams of the different directional characteristics are without overlap.

One configuration is that the control apparatus is configured to connect the information reading apparatus alternately to different signal outputs of the antenna apparatus. Since the signal outputs are connected to different directional characteristics, signals from different spatial areas are thus supplied to the information reading apparatus in this configuration.

In one configuration, it is intended that the data processing apparatus is configured to evaluate the received signal with respect to the direction of the transmitter. In this configuration, it is determined at least in what direction relative to the antenna the apparatus transmitter is positioned. In a further configuration, the position or at least the spatial area of the transmitter is determined.

One configuration is that the apparatus comprises a signal source and that the signal source is configured to generate an excitation signal that is radiated by the antenna apparatus. When the transmitters are passive components, such as RFID transponders, the same receive a wake-up signal and the energy for emitting signals, respectively, from a signal source. In one configuration, the signal source is a component of the information reading apparatus. In one configuration, the information reading apparatus transmits the excitation or wake-up signal with the same directional characteristics by which the response signals are received that are supplied to the information reading apparatus. Thus, those transmitters from which the response signals are primarily received are activated.

In one configuration, it is intended that the transmitter is a radio frequency identification transponder. Thus, the transmitter is an RFID transponder or RFID tag and accordingly, the information reading apparatus is an RFID reader, in particular comprising the signal source for activating the RFID transponder. When the information reading apparatus emits the activation signal with a directional characteristic, only the RFID transponders within the allocated spatial area are activated.

One configuration is that the transmitter is a satellite. Accordingly, the information reading apparatus is a satellite receiver receiving the satellite signals and extracting data transmitted thereby.

In one configuration, it is intended that the control apparatus is configured to alternately connect the information reading apparatus to different signal outputs of the antenna apparatus and respective further signal outputs of the antenna apparatus to the data processing apparatus. Thus, one signal output each is connected to the information reading apparatus and remaining signal outputs are connected to the data processing apparatus.

Additionally, the invention solves the object by a method for determining at least one piece of information on a position of a transmitter. The method comprises at least the following steps: signals originating from the transmitter are received with different directional characteristics. Here, the directional characteristics each relate to an amount of spatially different receive sensitivities. From at least one received signal, data or information transmitted with the signal are determined or extracted. Other received signals (or at least one other signal) are evaluated with respect to their physical characteristics and with respect to the information on the position of the transmitter. Thus, the signals are received with different directional characteristics and at least one received signal is evaluated differently from the other received signals when data that the signal carries or transmits, respectively, are read out from this signal.

Accordingly, the configurations of the apparatuses can also be realized by the method such that the allocated statements apply accordingly. This also applies vice versa so that the method can also be realized by the apparatus.

In detail, there are a plurality of options of implementing and developing the inventive apparatus and the inventive method. In this regard, reference is made, on the one hand, to the claims and, on the other hand, to the following description of embodiments in connection with the drawings.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
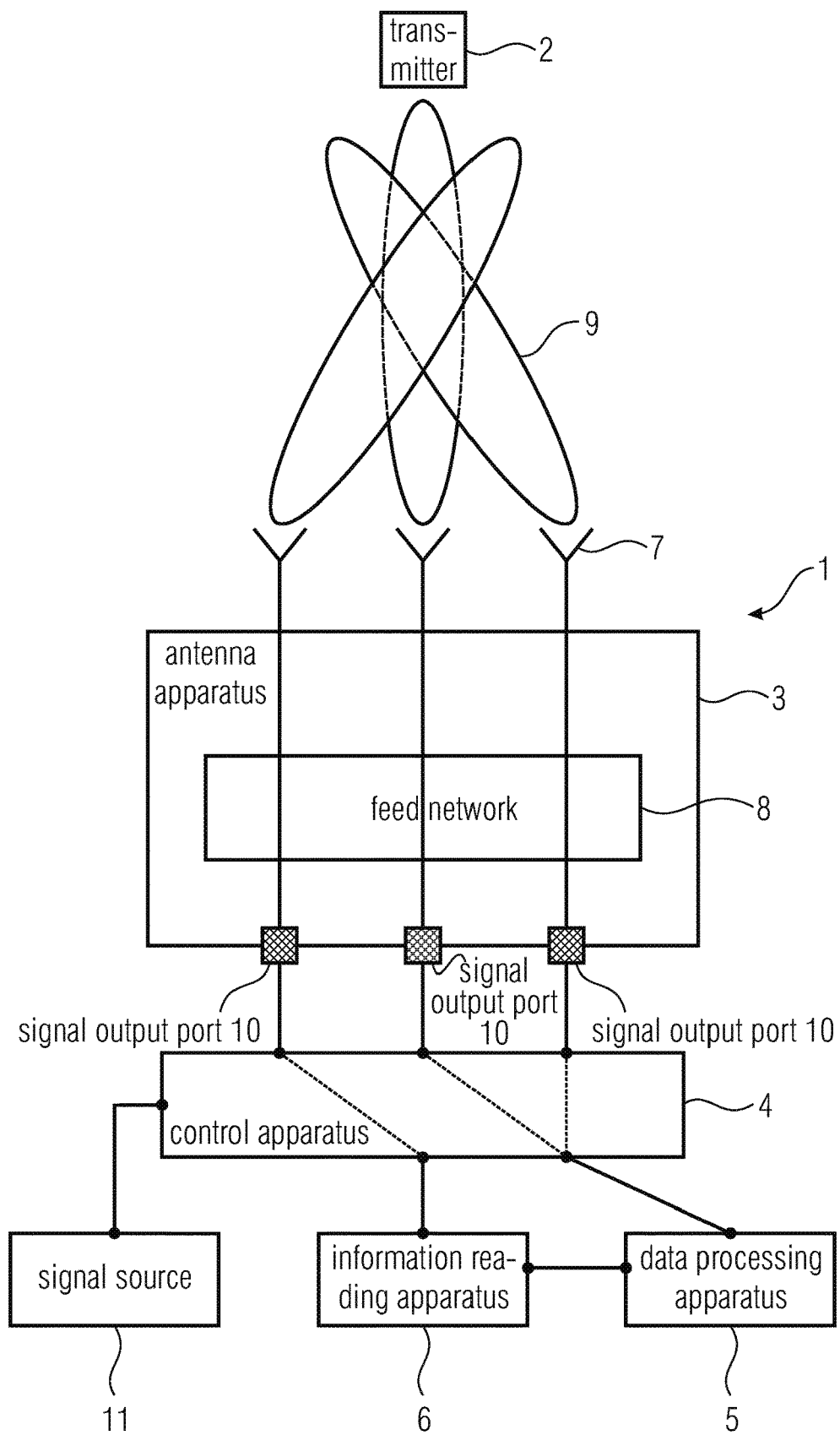
FIG. 1 a schematic illustration of an inventive apparatus and its application and
FIG. 2 a basic diagram for illustrating the method.

FIG. 1 shows a schematic configuration of the inventive apparatus 1 serving to determine the position of the transmitter 2. For this, the apparatus 1 comprises an antenna apparatus 3 having three antenna elements 7 as an example.

The antenna elements 7 are connected to the outputs of a feed network 8. Via the feed network, directional characteristics 9 respectively connected to the antenna elements 7 can be generated and switched by the control apparatus. For transmitting, e.g., excitation signals, the directional characteristics can also be superposed which has a respective effect in signal shaping. If the antenna apparatus 3 receives signals, on the other hand, the same are separated by the feed network 8 into the individual directional characteristics and output individually via the signal outputs 10. Thus, in the shown embodiment, with three antenna elements 7 and three directional characteristics 9, the antenna apparatus 3 has also three signal outputs 10.

For further signal processing, the control apparatus 4 is provided, which connects the signal outputs 10 to the information reading apparatus 6 and to the data processing apparatus 5, respectively. Here, the control apparatus 4 connects one signal output to the information reading apparatus 6 and the remaining signal outputs 10 to the data processing apparatus 5.

The information reading apparatus 6 and the data processing apparatus 5 both process the received signals and evaluate the same. In the shown configuration, both apparatuses 5, 6 evaluate the signals with respect to their physical characteristics. In that way, for example, both apparatuses 5, 6 determine an amount of the field strength of the signals or possibly also the phase values of the actually complex signals. However, the difference is that only the information reading apparatus 6 also extracts information from the signals that are transmitted by the signals as data. This means only the information reading apparatus 6 can extract, e.g. identification marks or, e.g. digital information from the signals. The data processing apparatus 5 does not provided this higher evaluation in the illustrated configuration and the same evaluates the signals only e.g., with respect to the amplitude or its phase. In an alternative configuration—not illustrated—the data processing apparatus 5 also has the ability of extracting data.

All in all, the illustrated apparatus 1 enables the evaluation of the received signals with respect to their physical characteristics and with respect to the information on the position of the transmitter 2.

In the shown example, the signals are respectively received simultaneously and result from a radiation by the transmitter 2.

Here, the data processing apparatus 5 also receives data from the information reading apparatus 6 (e.g. the determined RSSI value) in order to determine, all in all, the information on the position of the transmitter 2 or at least on the direction.

Since the transmitter 2 is a passive transmitter in the form of an RFID transponder in the shown example, the apparatus 1 additionally has a signal source 11 generating an excitation signal radiated via the antenna apparatus 3 and received by the transmitter 2 so that the same can also radiate signals. Here, the transmitted information is at least an identification mark of the transmitter 2.

In an alternative configuration—not illustrated—the signal source 11 and the reader 6 belong to one device. The same is, for example, an RFID reader.

Thus, in one configuration, the invention enables the provision of amplitude and phase information of the received signals of the transmitters 2 or specifically RFID transponders that have been excited by one or several readers as respective information reading apparatus 6. This takes place with a multi-beam antenna as antenna apparatus 3, whose individual elements or antenna elements 7 are connected to a feed network 8, such as a Butler matrix.

Generally, such a beam shaping network 8 has a plurality of inputs and outputs. By controlling at least one of these ports 10 (i.e. an input and output, respectively) for the transmission case, a specifically shaped directional characteristic (beam) 9 is formed. When feeding the other ports 10, a different beam shape results.

By using the feed network 8, one port 10 of the antenna apparatus 3 is connected to the signal source 11 (in an alternative configuration, not illustrated, the antenna apparatus 3 would be connected to the information reading apparatus 6) in order to emit the exciting signal with the respective directional characteristic 9. Thereby, the RFID transponders are excited as transmitters 2. The incident signals are tapped via the same port (i.e. via signal output) 10 and are directly supplied to the RFID reader as configuration of the information reading apparatus 6, essentially without signal power loss.

In one configuration, it is intended that by using the beam-shaping network as a configuration of the feed network 6, merely one beam, i.e. only one directional characteristic is formed in the multi-beam antenna 3 for the transmitting case at any time t.

In the receive case, however, the signal information of all beams, i.e. all directional characteristics are provided at the ports 10 of the feed network 8. Since these beams overlap in the present configuration (see FIG. 2), excited transponders 2 are also in partial sections in at least one of the residual receiving beams. Since such a beam forming network 8 is not absolutely symmetrical in practice, small signal portions also drop at the (m−1) remaining m ports 10 of the network 8 not connected to the information reading apparatus 6. In particular the overlapping of the beams is used. Thereby, signal portions of transponders which are excited by the active beam (port with transmitting/reading apparatus) drop at the remaining ports that are connected to the data processing apparatus 5. This signal information is provided to electronics (data processing apparatus 5) integrated directly in a multi-beam antenna 3 or externally available for directional estimation.

By suitable switching logic, switching between the ports 10 of the beam forming network 8 is performed in the shown configuration. This means that the RFID reader 6 is continuously connected to all inputs 10 of the network 8, but at the time t only to one of them. Accordingly, the remaining ports to the data processing apparatus 5 are also switched for directional estimation.

Thereby, after a specific time t1, an amount of directional information in amplitude and phase are present in dependence on the number of antenna elements 7 and directional characteristics 9, and the switching time. The same can then be computed and possibly occurring erroneous information by reflections and ambiguities can be detected and considered.

By such a multi-beam antenna 3 having a respective beam-shaping network 8, the reading and transmitting path of the information reading apparatus 6 is almost not affected. By the superposition of the beams of a multi-beam antenna, transponders are excited which are detected by at least one of the adjacent beams in the receive case, see FIG. 2.

Thus, the signal information can be tapped at the decoupled ports 10 of the feed network 8 that do not correspond to the direct signal path of the reader 6 at this time, without influencing the signal path of the reader 6. This is mandatory for the range of the reader and the proper operation of the reader since the power of the returned signal of the passive transponders 2 is very low. For that reason, the readers 6 have high signal sensitivity.

Figure 2:
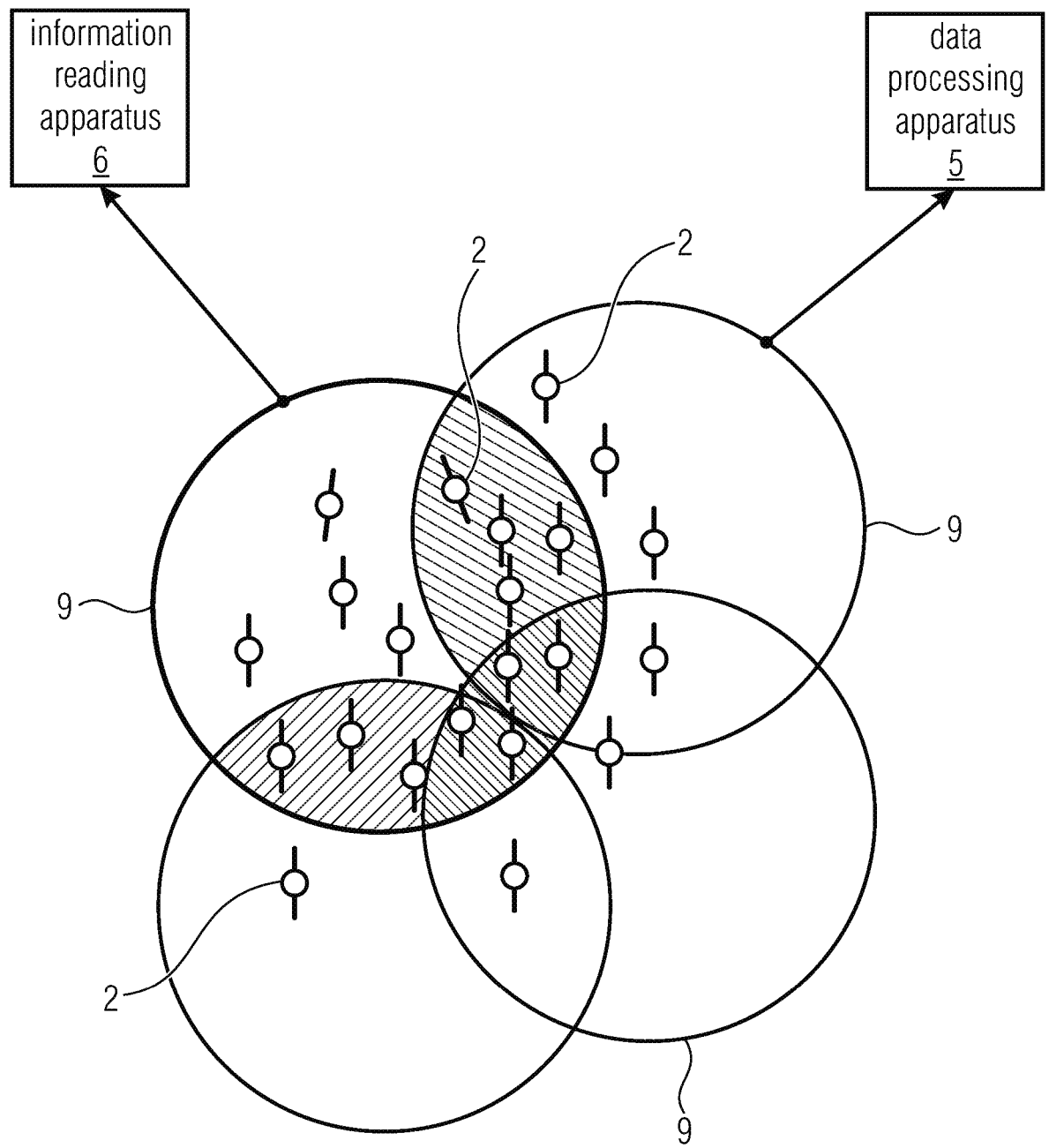

FIG. 2 shows schematically a plurality of transmitters 2 in the form of RFID transponders. Here, the four circles indicate four different directional characteristics 9. The signals received with a directional characteristic 9 (thick edge) are supplied to the information reading apparatus 6 (indicated by the arrow). There, the transmitted signals and also a value for the signal amplitude (the RSSI value) are determined from the signals. The signals received with the remaining three directional characteristics 9 are supplied to the data processing apparatus 5.

It can be seen that the directional characteristics 9 overlap (shaded region), such that, for the receive case, the signals of some transmitters 2 reach the information reading apparatus 6 and are also evaluated with respect to the position by the data processing apparatus 5.

The present invention allows integration of the electronics for directional estimation directly into the antenna apparatus 3. This results in the advantage that directional estimation and determining information on the position of the transmitter becomes independent of the used information reading apparatus 6 (e.g. the respective RFID reader). Additionally, the received signal guided to the information reading apparatus 6 is hardly influenced since the other antenna elements 7 receive signals and are thus generally provided with a terminating resistor in conventional technology. In the compact integration into the antenna apparatus 3, only one signal line to the information reading apparatus 6 is needed in one configuration.

The invention is suitable for any frequencies and frequency ranges, respectively, the construction can also be converted for optical systems, e.g. by lenses.

Technical fields of application are in the field of logistics. Here, the invention allows the management of objects within storage halls and production environments. The invention also allows autonomous navigation of industrial trucks. In production, the invention eases the management of work pieces and work piece carriers. In the field of satellite communication, automatic tracking is possible if a satellite disappears behind the horizon or the received power for the front end becomes too low for evaluation.

For the latter case of application, one configuration provides that the information reading apparatus 6 is directed into one direction via one directional characteristic. The other directional characteristics and the signals received therewith, respectively, allow the identification of further satellites as well as the estimation of their transmission power by the amplitudes of the received signals. Thus, if a connection via the directional characteristic by which the information reading apparatus 6 receives the signals deteriorates, switching to a different directional characteristic having a better signal ratio can take place. The same applies also to other scenarios with multiple or possibly movable transmitters.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier. In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC, or for example a microprocessor, e.g. in the form of an ARM architecture.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Kalis et al., "Direction Finding in IEEE802.11 Wireless Networks", IEEE Transactions on Instrumentation and Measurement, vol. 51, no. 5, pages 940-948, 2002.
[2] B. N. Hood et al., "Estimating DoA From Radio-Frequency RSSI Measurements Using an Actuated Reflector, IEEE Sensors Journal, vol. 11, no. 2, pages 413-417, 2011.
[3] G. Giorgetti et al., "Single-Anchor Indoor Localization Using a Switched-Beam Antenna", IEEE Communications Letters, vol. 13, no. 1, pages 1-3, 2009.
[4] M. Passafiume et al., "On the duality of Phase-based and Phase-less RSSI MUSIC algorithm for Direction of Arrival estimation", Proc. of the 3rd International Conference on Circuits, Systems, Communications, Computers and Applications (CSCCA), pages 48-54, 2014.
[5] D. L. Nguyen, "Switched Beam Array Antenna for 2.45 GHz RFID Localisation", Dissertation, The University of Hull, 2011.
[6] Kathrein RFID KRAI Solutions EuroID_2013.pdf

The invention claimed is:

1. Apparatus for determining at least one piece of information on a position of a transmitter,
comprising an antenna apparatus, a control apparatus and a data processing apparatus,
wherein the antenna apparatus comprises several different directivities,
wherein the directivities each relate to an amount of spatially different receive sensitivities of the antenna apparatus,
wherein the antenna apparatus comprises several signal output ports,
wherein the directivities are allocated to the signal output ports,
wherein the control apparatus is configured to connect one signal output port of the antenna apparatus to an information reading apparatus and further signal output ports of the antenna apparatus to the data processing apparatus,
wherein the information reading apparatus is configured to determine data from received signals that are transmitted with the signals and
wherein the data processing apparatus is configured to evaluate received signals with respect to their signal amplitudes and/or phases.

2. Apparatus according to claim 1,
wherein the apparatus comprises the information reading apparatus as a component.

3. Apparatus according to claim 1,
wherein the information reading apparatus is configured to determine both from the received signals the data transmitted with the signals and to evaluate the received signals with respect to their signal amplitudes and/or phases.

4. Apparatus according to claim 1,
wherein the antenna apparatus comprises several antenna elements,
wherein the antenna elements comprise one directivity each, and
wherein the signal output ports are connected to different antenna elements.

5. Apparatus according to claim 1,
wherein the antenna apparatus comprises a feed network and
wherein the feed network effects different directivities of the antenna apparatus.

6. Apparatus according to claim 5,
wherein the feed network is configured to separate signals received with the antenna apparatus into the individual directivities.

7. Apparatus according to claim 1,
wherein the control apparatus is configured to connect the information reading apparatus alternately to different signal output ports of the antenna apparatus.

8. Apparatus according to claim 1,
wherein the antenna apparatus is configured as multi-beam antenna and
wherein the directivities differ from one another at least with respect to the orientation of the beams.

9. Apparatus according to claim 1,
wherein the directivities partly overlap.

10. Apparatus according to claim 1,
wherein the apparatus comprises a signal source and
wherein the signal source is configured to generate an excitation signal that is radiated by the antenna apparatus.

11. Apparatus according to claim 1,
wherein the transmitter is a radio frequency identification transponder.

12. Apparatus according to claim 11,
wherein the information reading apparatus is a radio frequency identification reader.

13. Apparatus according to claim 1,
wherein the control apparatus is configured to connect the information reading apparatus alternately to different signal output ports of the antenna apparatus and respective further signal output ports of the antenna apparatus to the data processing apparatus.

14. Method for determining at least one piece of information on a position of a transmitter,
receiving signals originating from the transmitter with an antenna apparatus with different directivities each relating to an amount of spatially different receive sensitivities, wherein the antenna apparatus comprises several signal output ports, and wherein the directivities are allocated to the signal output ports,
connecting one signal output port of the antenna apparatus to an information reading apparatus and further signal output ports of the antenna apparatus to the data processing apparatus,
determining data transmitted with the signals the information reading apparatus from the received signal, and
evaluating the other received signals with respect to their signal amplitudes and/or phases and with respect to the information on the position of the transmitter.

15. Apparatus for determining at least one piece of information on a position of a transmitter,
comprising an antenna apparatus, a control apparatus and a data processing apparatus,
wherein the antenna apparatus comprises several different directivities,
wherein the antenna apparatus comprises a feed network,
wherein the feed network effects different directivities of the antenna apparatus and is configured to separate signals received with the antenna apparatus into the individual directivities,
wherein the directivities each relate to an amount of spatially different receive sensitivities of the antenna apparatus,
wherein the antenna apparatus comprises several signal output ports,
wherein the directivities are allocated to the signal output ports,
wherein the control apparatus is configured to connect one signal output port of the antenna apparatus to an information reading apparatus and further signal output ports of the antenna apparatus to the data processing apparatus,
wherein the control apparatus is configured to connect the information reading apparatus alternately to different signal output ports of the antenna apparatus and respective further signal output ports of the antenna apparatus to the data processing apparatus,
wherein the information reading apparatus is configured to determine data from received signals that are transmitted with the signals and
wherein the data processing apparatus is configured to evaluate received signals with respect to their signal amplitudes and/or phases.

* * * * *